United States Patent
Cartechini

(10) Patent No.: US 11,485,427 B2
(45) Date of Patent: Nov. 1, 2022

(54) DRILLING MACHINE WITH BLOCKING SYSTEM

(71) Applicant: HPM—HYDRAULIC PERFORMANCE MACHINES S.R.L., Recanati (IT)

(72) Inventor: Giuseppe Cartechini, Recanati (IT)

(*) Notice: Subject to any disclaimer, the term of this patent is extended or adjusted under 35 U.S.C. 154(b) by 379 days.

(21) Appl. No.: 16/777,208

(22) Filed: Jan. 30, 2020

(65) Prior Publication Data
US 2020/0247485 A1 Aug. 6, 2020

(30) Foreign Application Priority Data
Feb. 1, 2019 (IT) .................. 102019000001543

(51) Int. Cl.
*E21B 7/02* (2006.01)
*B62D 33/06* (2006.01)

(52) U.S. Cl.
CPC ............ *B62D 33/0617* (2013.01); *E21B 7/02* (2013.01)

(58) Field of Classification Search
CPC ............................... E21B 7/02; B62D 33/0617
See application file for complete search history.

(56) References Cited

U.S. PATENT DOCUMENTS

| | | | | |
|---|---|---|---|---|
| 3,575,222 A * | 4/1971 | Tucek | .................. | A01G 23/089 144/34.1 |
| 3,645,343 A * | 2/1972 | Mays | ...................... | E21B 15/04 173/147 |
| 5,016,721 A * | 5/1991 | Yamamoto | ................. | E02F 9/24 49/394 |
| 5,337,847 A * | 8/1994 | Woods | .................. | A01G 23/083 180/41 |
| 6,158,539 A * | 12/2000 | Isley | ..................... | B62D 55/116 280/6.154 |
| 6,241,263 B1 * | 6/2001 | Hicks | ........................ | B60G 9/02 280/6.154 |
| 7,730,647 B2 * | 6/2010 | Kubo | ........................ | E02F 9/02 37/231 |

(Continued)

FOREIGN PATENT DOCUMENTS

| | | |
|---|---|---|
| EP | 2963190 B1 | 1/2016 |
| WO | 0246539 A1 | 6/2002 |
| WO | 2018007236 A1 | 1/2018 |

OTHER PUBLICATIONS

Search Report Form IT237 "Written Opinion"; dated Sep. 17, 2019 with reference to the priority Italian Patent Application No. 102019000001543.

*Primary Examiner* — Taras P Bemko
(74) *Attorney, Agent, or Firm* — Egbert, McDaniel & Swartz, PLLC

(57) ABSTRACT

A drilling machine including: a lower unit, an upper unit, a mast, a rotary, a drilling tool connected to a telescopic Kelly bar and a blocking system suitable for blocking the rotation of the upper unit relative to the lower unit. The blocking system includes: a cylinder revolvingly mounted on a frame of the lower unit, a plurality of vises mounted on the frame of the lower unit in such a way to block the cylinder integrally with the lower unit, and an actuator mounted in the upper unit to actuate a blocking pin that is engaged in a hole of a bushing of a flange that protrudes radially outwards from said cylinder in such a way to integrally block the cylinder to the upper unit.

8 Claims, 2 Drawing Sheets

(56) References Cited

U.S. PATENT DOCUMENTS

2010/0264694 A1\* 10/2010 Crawford ............... E02F 9/028
                                                  296/190.05
2016/0201394 A1\* 7/2016 Spreitzer ................ E21B 43/10
                                                  175/57

\* cited by examiner

DRILLING MACHINE WITH BLOCKING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a drilling machine with a telescopic Kelly bar, which is used to drill holes in the ground and is provided with a blocking system suitable for blocking a rotation of an upper unit (tower) relative to a lower unit (undercarriage).

2. Description of Related Art Including Information Disclosed Under 37 CFR 1.97 and 37 CFR 1.98

FIG. 1 shows a drilling machine (100) comprising a lower unit (1) and an upper unit (2) that is revolvingly mounted relative the lower unit (1) around an axis of vertical rotation (Y). The lower unit (1) is a crawler undercarriage (10). Obviously, tires can be used instead of the tracks. The upper unit (2) is a tower with a user station (20).

A mast (3) is connected to the upper unit (2) by means of an articulated system (S) or equivalent systems, such as trolleys or slides.

A rotary (4) is supported by a support (40) that is mounted on the mast (3) with possibility of translating vertically.

The mast (3) is provided with a winch (60) with a rope (61) that is passed through a head (6) of the mast and is connected to the internal tube of a telescopic Kelly bar (51).

A drilling tool (5) has a connection joint (50) connected to the internal rube of the Kelly bar (51). The tool (5) is lifted by the winch (60) and is rotated by the rotary (4). The Kelly bar (51) has a vertical axis (Y1) parallel to the axis of rotation (Y) of the upper unit (2).

These types of drilling machines are operated according to work cycles that consist in:
lowering and rotating the tool (5) in order to cut and drill a portion of ground (T) in such a way to obtain a hole (F), and
lifting the tool (5) to unload the material removed during drilling.

However, before starting the work cycle, the drilling machine is moved to the predefined drilling point by means of a translation with the tracks (10) of the undercarriage; the tower is rotated relative to the undercarriage and the articulated system (S) is moved until the tool (5) is disposed in correspondence of the predefined point where the hole is to be drilled.

The, the drilling cycle comprises:
a) a first rotation step of the upper unit (2) relative to the lower unit (1) until the tool (5) is disposed in the predefined drilling point,
b) a second descending step of the tool (5) until the surface of the ground (T) to be drilled is reached;
c) a third drilling step that provides for cutting and loading the soil, rotating and moving the tool (5) forward in the ground;
d) a fourth lifting step of the tool (5) above the ground (T),
e) a fifth rotation step of the upper unit (2) relative to the lower unit (1) to bring the tool (5) to a chosen unloading area, and
f) a sixth unloading step of the tool (5) wherein the soil accumulated on the tool is unloaded.

In this type of drilling machine with telescopic Kelly bar, such a work cycle is repeated several times, for example one hundred times, if the drilling depth is 30 meters.

During the third drilling and loading step (c), axial forces and rotative torques will determine the rotation of the upper unit (2) relative to the lower unit (1).

The relative rotations of the upper unit (2) relative to the lower unit (1), namely the first step (a) and the fifth step (e), are usually performed by means of a hydraulic motor disposed upstream a multi-stage epicyclic reduction gear. The epicyclic reduction gear has an output shaft connected to a pinion. The epicyclic reduction gear and the pinion are disposed in the upper unit (2).

The lower unit (1) has a frame (11) wherein a revolving ring of a thrust block (12) with toothed crown is fixed. The teeth of the pinion of the reduction gear are engaged in the toothed crown of the thrust block that is fixed in the lower unit (1).

During the third drilling step (c), the rotation of the upper unit (2) relative to the lower unit (1) is generally prevented by an internal brake of lamellar negative type, which is disposed upstream or downstream the hydraulic motor and in any case upstream the multi-stage epicyclic reduction gear.

However, being disposed upstream the reduction gear, the internal brake cannot prevent the small rotations caused by the clearance in the gears of the single reduction stages of the epicyclic reduction gear and between the pinion of the reduction gear and the toothed crown of the thrust block. The rotations caused by the aforementioned clearance are often converted into rotative vibrations of the entire upper unit (2), which are especially evident when drilling a rocky ground. The vibrations affect all the upper parts of the machine, including the control cabin (20), causing structural damage to far-away parts by fatigue, as well as damage and/or discomfort to the operator in the control cabin.

WO2018/007236, in the name of the same applicant, discloses a foundation drilling machine provided with a braking system disposed downstream the epicyclic reduction gear in order to brake the rotation of the upper unit relative to the lower unit.

EP2963190 discloses a construction machine with a braking disc and multiple braking units that peripherally act on the braking disc in such a way to brake the rotation of the upper unit relative to the lower unit.

WO0246539A1 discloses a system for leveling the upper structure of a vehicle when the vehicle is situated on an irregular ground.

Although the braking systems of the prior art guarantee a higher braking force compared to the internal brake of the hydraulic motor, they do not guarantee a perfect blocking between the upper unit and the lower unit.

In the braking systems of the prior art, the blocking of the upper unit relative to the lower unit is performed using a braking disc that is integral with the lower unit and vises that are integral with the upper unit or vice versa. However, the high number of openings and closings of the vises on the braking disc, which corresponds to the number of work cycles, and the sliding between disk and vise cause a rapid deterioration of the disc and of the vise parts.

Moreover, in the systems of the prior art, the upper unit can be blocked to the lower unit by means of a pin that is engaged in a hole. However, this would prevent the rotation of the upper unit during the positioning of the tool in the hole to be drilled. In such a case, the positioning of the tool must be performed by moving the lower unit and requires a large work area for positioning the machine, which must be different from the work area that is necessary for a machine wherein the upper unit can rotate by 360°.

BRIEF SUMMARY OF THE INVENTION

The purpose of the present invention is to eliminate the drawbacks of the prior art by disclosing a drilling machine provided with a blocking system that is suitable for blocking a rotation of the upper unit relative to a lower unit, which is efficient, reliable, safe, versatile, compact, inexpensive and easy to install.

These purposes are achieved according to the invention with the characteristics of the independent claim 1.

Advantageous embodiments of the invention appear from the dependent claims.

The drilling machine according to the invention is defined by claim 1.

BRIEF DESCRIPTION OF THE SEVERAL VIEWS OF THE DRAWINGS

Additional features of the invention will be clearer from the following detailed description, which refers to a merely illustrative, not limiting embodiment, which is shown in the appended figures, wherein.

DETAILED DESCRIPTION OF THE INVENTION

Figure 1:
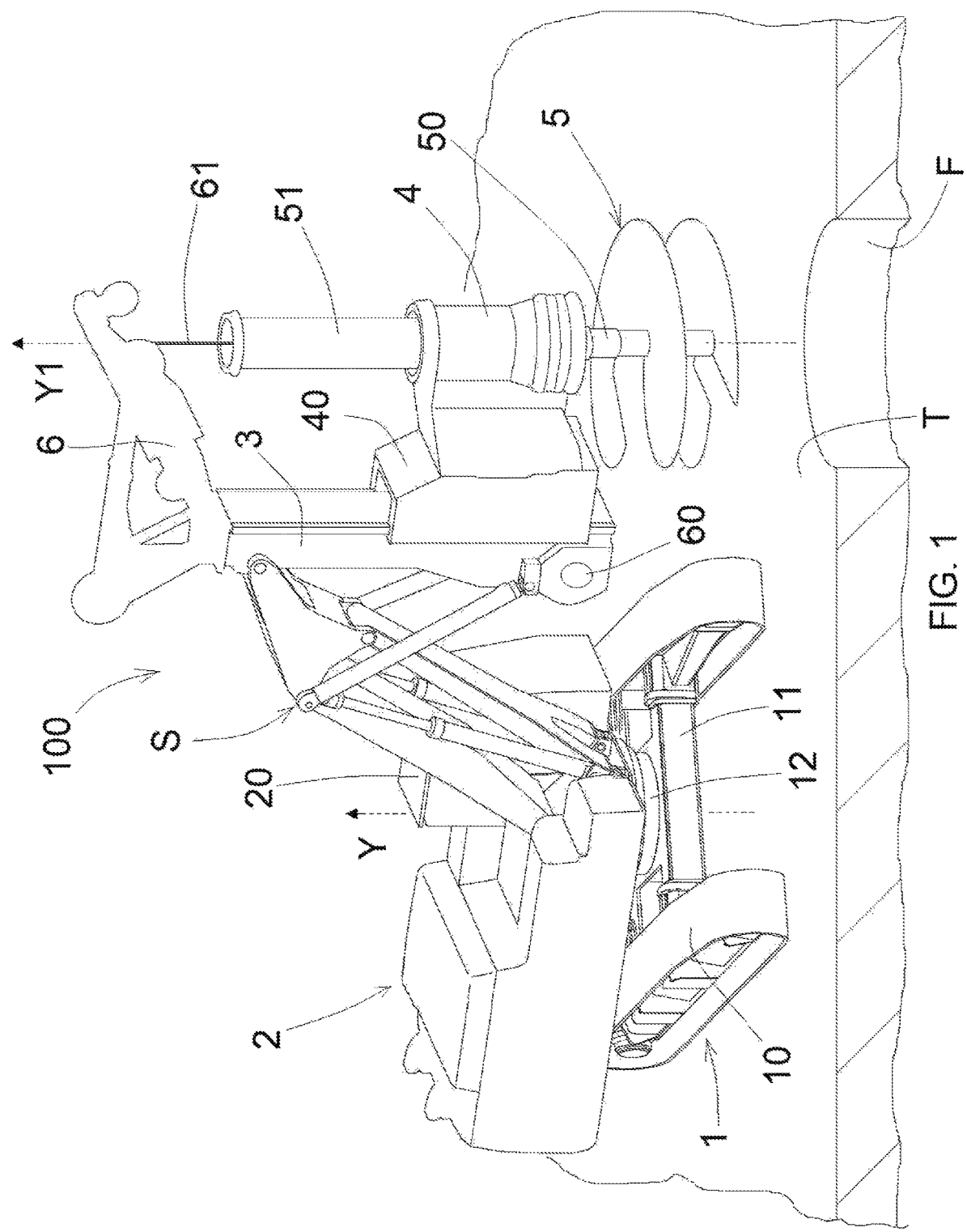
FIG. 1 is a perspective view of a drilling machine.
Figure 2:
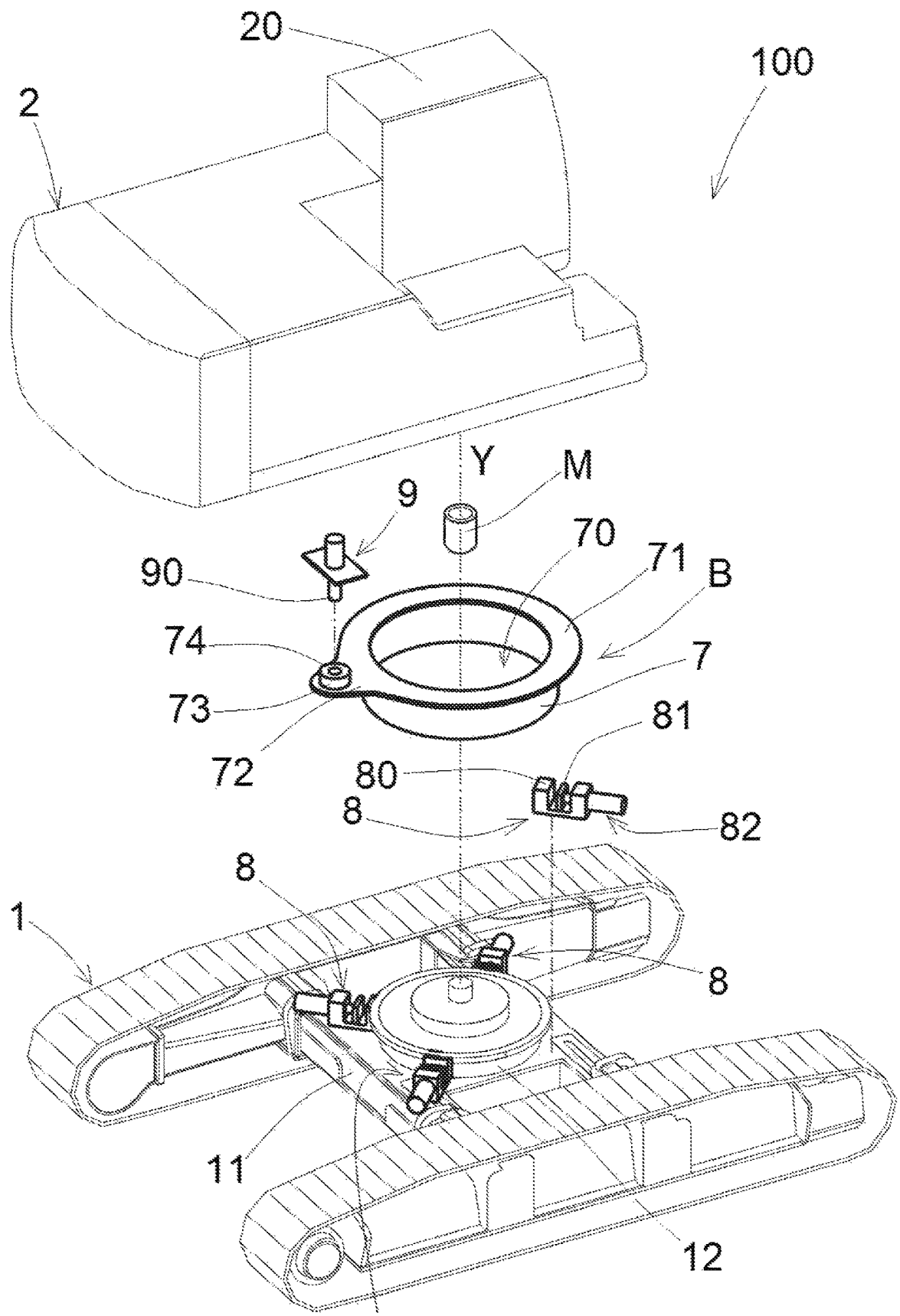
FIG. 2 is an exploded perspective view of the blocking system according to the invention, disposed between a lower unit and an upper unit of the machine.

In the following description, elements that are identical or corresponding to the ones described above will be indicated with the same numerals, omitting their detailed description.

The machine (100) according to the invention comprises a blocking system (B) suitable for blocking the rotation of the upper unit (2) relative to the lower unit (1).

The blocking machine (B) comprises a cylinder (7) that is revolving mounted on the frame (11) of the lower unit in such a way to rotate around the axis of rotation (Y) of the upper unit. The cylinder (7) is revolvingly mounted also relative to the upper unit (2).

The cylinder (7) has an axial channel (70) that is open on the top and on the bottom and is disposed around the thrust block (12).

A plurality of vises (8) is mounted on the frame (11) of the lower unit in such a way to block the cylinder (7) integrally with the lower unit (1). For example, four vises are provided, angularly spaced by 90°.

Each vise (8) has a fixed jaw (80) and a mobile jaw (81) actuated by an actuator (82), for example a hydraulic actuator. The vises (8) are disposed in such a way that the cylinder (7) is disposed between the fixed jaw (80) and the mobile jaw (81) of each vise. By actuating the actuator (82), the cylinder (7) is tightened between the fixed jaw (80) and the mobile jaw (81) of each vise.

In this way, the vises (8) are open only during the rotation of the upper unit to position the tool in correspondence of the drilling point, before starting a new drilling operation, whereas the vises (8) are closed during all the work cycles to perform a drilling operation.

The cylinder (7) has an upper collar (71) that projects radially outwards. The upper collar (71) has a flange (72) that projects outwards wherein a bushing (73) with a hole (74) is disposed.

An actuator (9) integral with the upper unit (2) actuates a blocking pin (90) that is inserted in the hole (74) of the bushing, in such a way to block the cylinder (7) integrally with the upper unit (2). The blocking of the cylinder (7) relative to the upper unit (2) can be performed after the first step (a) and before the fifth step (e) of each drilling cycle.

During the third drilling step (c), the blocking pin (90) remains inserted in the bushing (73), preventing any movement of the upper unit (2) relative to the lower unit (1) because the cylinder (7) has been previously blocked with the lower unit (1).

When the third drilling step (c) is completed, the pin (90) returns to its initial position, making the upper unit (2) independent from the lower unit (1) and from the cylinder (7), and therefore allowing for the rotation of the upper unit (2) during the fifth step (e).

Position detection means (M) detect the position of the hole (74) of the bushing, so that the actuator (9) actuates the blocking pin (90) when the blocking pin (90) is aligned with the hole (74) of the bushing.

The position detection means (M) can be proximity sensors disposed near the bushing (73) or an encoder suitable for detecting the rotation of the cylinder (7).

When all the work cycles that are necessary to complete the drilling operation are completed, the cylinder (7) is made integral with the upper unit (2) by inserting the blocking pin (90) in the hole of the bushing, the vises (8) are unblocked and the machine (100) can move with the tracks to a new work area. The upper unit (2) and the cylinder (7) can rotate in such a way that the tool (5) is exactly position in the drilling point, and successively the cylinder (7) is blocked with the lower unit (1).

The blocking system (B) according to the present invention has many advantages with respect to the braking systems of the prior art. In fact, the provision of the cylinder (7) that is revolvingly mounted relative to the lower unit (1) and to the upper unit (2) provides a more efficient blocking using a pin that is engaged in a hole, and a higher freedom of movement when the upper unit is to be rotated with respect to the lower unit.

Numerous equivalent variations and modifications, which are within the reach of an expert of the field and fall in any case within the scope of the invention as disclosed by the appended claims, can be made to the present embodiment of the invention.

I claim:

1. A drilling machine comprising:
   a lower unit having a frame;
   an upper unit rotatable with respect to said lower unit around a vertical axis of rotation;
   a mast connected to said upper unit;
   a rotary supported by said mast;
   a drilling tool connected to a telescopic Kelly bar, said drilling tool be drivedly connected to said rotary; and
   a blocking system adapted to block a rotation of said upper unit relative to said lower unit, said blocking system comprising:
      a cylinder rotatably mounted on the frame of said lower unit so as to rotate around the vertical axis of rotation of said upper unit;
      a plurality of vises mounted on the frame of the lower unit so as to block said cylinder and said lower unit; and
      an actuator mounted in said upper unit, said actuator cooperative with a blocking pin engaged in a hole of a bushing of a flange that protrudes radially outwardly from said cylinder, said actuator actuating the blocking pin so as to block said cylinder to said upper unit; and
   a thrust block with a toothed crown mounted in the frame of said lower unit, the cylinder being internally empty and disposed around said thrust block.

2. The drilling machine of claim 1, wherein said plurality of vises are actuated by a hydraulic actuator.

3. The drilling machine of claim 1, wherein said actuator is a hydraulic actuator.

4. The drilling machine of claim 1, wherein said lower unit is a crawler undercarriage, said upper unit being a tower with a user station.

5. A drilling machine comprising:
   a lower unit having a frame;
   an upper unit rotatable with respect to said lower unit around a vertical axis of rotation;
   a mast connected to said upper unit;
   a rotary supported by said mast;
   a drilling tool connected to a telescopic Kelly bar, said drilling tool be drivedly connected to said rotary; and
   a blocking system adapted to block a rotation of said upper unit relative to said lower unit, said blocking system comprising:
      a cylinder rotatably mounted on the frame of said lower unit so as to rotate around the vertical axis of rotation of said upper unit;
      a plurality of vises mounted on the frame of the lower unit so as to block said cylinder and said lower unit; and
      an actuator mounted in said upper unit, said actuator cooperative with a blocking pin engaged in a hole of a bushing of a flange that protrudes radially outwardly from said cylinder, said actuator actuating the blocking pin so as to block said cylinder to said upper unit, wherein said cylinder has an upper collar that protrudes radially outwardly, the flange protruding radially outwardly from the upper collar.

6. A drilling machine comprising:
   a lower unit having a frame;
   an upper unit rotatable with respect to said lower unit around a vertical axis of rotation;
   a mast connected to said upper unit;
   a rotary supported by said mast;
   a drilling tool connected to a telescopic Kelly bar, said drilling tool be drivedly connected to said rotary; and
   a blocking system adapted to block a rotation of said upper unit relative to said lower unit, said blocking system comprising:
      a cylinder rotatably mounted on the frame of said lower unit so as to rotate around the vertical axis of rotation of said upper unit;
      a plurality of vises mounted on the frame, of the lower unit so as to block said cylinder and said lower unit; and
      an actuator mounted in said upper unit, said actuator cooperative with a blocking pin engaged in a hole of a bushing of a flange that protrudes radially outwardly from said cylinder, said actuator actuating the blocking pin so as to block said cylinder to said upper unit; and
   a position detector adapted to detect a position of the hole of the bushing such that said actuator actuates the blocking pin when the blocking pin is aligned with the hole of the bushing.

7. The drilling machine of claim 6, wherein said position detector comprises proximity sensors disposed adjacent the bushing.

8. The drilling machine of claim 6, wherein said position detector comprises an encoder adapted to detect the rotation of said cylinder.

* * * * *